United States Patent
Finis et al.

(10) Patent No.: US 10,971,916 B2
(45) Date of Patent: Apr. 6, 2021

(54) SPACE-LIMITED PROTECTION MODULE WITH AT LEAST TWO OVERVOLTAGE PROTECTION ELEMENTS IN PARALLEL CURRENT BRANCHES

(71) Applicant: PHOENIX CONTACT GMBH & CO KG, Blomberg (DE)

(72) Inventors: Gernot Finis, Kassel (DE); Christian Birkholz, Lippetal (DE); Steffen Pfoertner, Springe (DE)

(73) Assignee: PHOENIX CONTACT GMBH & CO KG, Blomberg (DE)

( * ) Notice: Subject to any disclaimer, the term of this patent is extended or adjusted under 35 U.S.C. 154(b) by 275 days.

(21) Appl. No.: 16/163,769

(22) Filed: Oct. 18, 2018

(65) Prior Publication Data

US 2019/0115745 A1   Apr. 18, 2019

(30) Foreign Application Priority Data

Oct. 18, 2017   (DE) .......................... 102017218582.1

(51) Int. Cl.
| | | |
|---|---|---|
| *H02H 1/04* | (2006.01) | |
| *H02H 9/04* | (2006.01) | |
| *H02H 3/08* | (2006.01) | |
| *H02H 3/20* | (2006.01) | |
| *H02H 3/26* | (2006.01) | |

(52) U.S. Cl.
CPC .............. *H02H 1/04* (2013.01); *H02H 3/085* (2013.01); *H02H 3/20* (2013.01); *H02H 3/26* (2013.01); *H02H 9/042* (2013.01)

(58) Field of Classification Search
CPC .......... H02H 1/04; H02H 9/042; H02H 3/085; H02H 3/20; H02H 3/26; H02H 9/044
See application file for complete search history.

(56) References Cited

U.S. PATENT DOCUMENTS

| | | | |
|---|---|---|---|
| 4,068,281 A * | 1/1978 | Harnden, Jr. ............ | H01C 7/10 338/20 |
| 2005/0041349 A1* | 2/2005 | Birkholz ................... | H01T 4/12 361/91.1 |
| 2020/0169078 A1* | 5/2020 | Birkholz ................ | H02H 9/041 |

FOREIGN PATENT DOCUMENTS

| | | |
|---|---|---|
| CN | 103618286 | 3/2014 |
| CN | 105914700 | 8/2016 |
| DE | 4124321 | 1/1993 |
| DE | 202016102862 | 9/2017 |
| EP | 0716494 | 6/1996 |

OTHER PUBLICATIONS

Official Action for German Patent Application No. 102017218582.1, dated Jul. 11, 2018, 6 pages.

* cited by examiner

*Primary Examiner* — Kyle J Moody
(74) *Attorney, Agent, or Firm* — Sheridan Ross P.C.

(57) ABSTRACT

The invention disclosure relates to a space-limited protection module with at least two overvoltage protection elements in parallel current branches, where the protection module includes a local multistage indicator for indicating at least one operating state, a warning state and a defect state, and where the parallel switched overvoltage protection elements are arranged on a circuit board in electrical connection to conductor tracks of the circuit board and attached in a thermally softenable manner.

10 Claims, 3 Drawing Sheets

Figure 1:
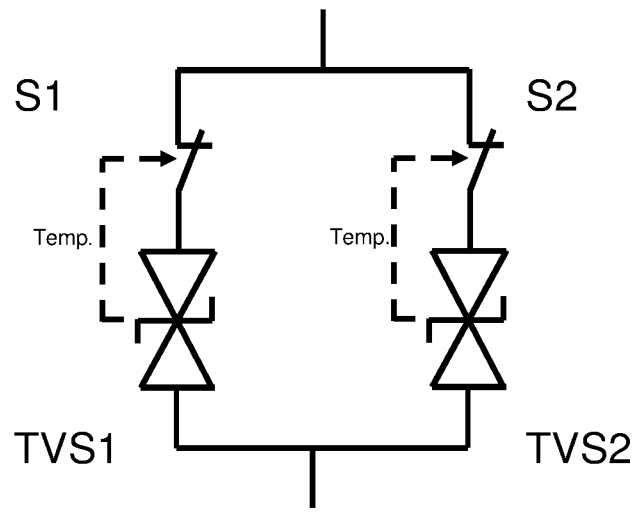

SPACE-LIMITED PROTECTION MODULE WITH AT LEAST TWO OVERVOLTAGE PROTECTION ELEMENTS IN PARALLEL CURRENT BRANCHES

CROSS-REFERENCE TO RELATED APPLICATIONS

This application claims the benefit of German Patent Application No. DE102017218582.1 filed Oct. 18, 2017, the entire contents of which are incorporated herein by reference.

The invention relates to a space-limited protection module with at least two overvoltage protection elements in parallel current branches.

BACKGROUND OF THE INVENTION

It is known from many fields of electrical engineering that protection devices are provided for the protection of installations and/or appliances.

Besides a protection against thermal overload due to heavy current flow, for example, overvoltage protection is also becoming increasingly important.

Overvoltages may have various causes. For example, they may be produced in networks by the switching of loads or by electrostatic discharges, such as thunderstorms, to mention only a few examples.

However, overvoltage devices may also malfunction.

In particular, the overloading of electronic components may result in their working outside of the rated operating range. The power conversion at the damaged component caused for example by a reduced insulation strength results in excessive heating. If the excessive heating of the component is not prevented, this may lead to damage to surrounding materials, the production of smoke gases, and/or a danger of fire. Depending on the component used, this may also result in an explosive destruction.

In order to prevent this, in the past a temperature fuse would be used with the component, in order to enable a shut-off under a given heating.

However, this arrangement is not suitable for very fast heating processes, due to the limited thermal coupling possibility.

Furthermore, signaling devices are very hard to realize in this way.

In measurement, control and regulation engineering, such overvoltage protection elements are typically integrated into protection modules. These protection modules can generally be arranged on a support rail. Structural size plays an outstanding role here.

But what all these layouts have in common is that, after the triggering of the temperature fuse and the associated disconnection of the overvoltage protection element, the overvoltage protection function is lost.

The loss of the protection is particularly problematic in larger installations, however, since it places the installation itself in danger until the corresponding protection module is replaced.

Against this background, the problem which the invention proposes to solve is to provide an economical solution which can provide a fast and reliable disconnection, and/or which continues to provide a protective function even after triggering the disconnection.

BRIEF PRESENTATION OF THE INVENTION

The solution to the problem is achieved, according to the invention, by the features of the independent claims. Advantageous embodiments of the invention are indicated in the dependent claims, the specification, and the figures.

BRIEF PRESENTATION OF THE FIGURES

In the following, the invention shall be explained more closely with reference to the enclosed drawing and with the aid of preferred embodiments.

Figure 2:
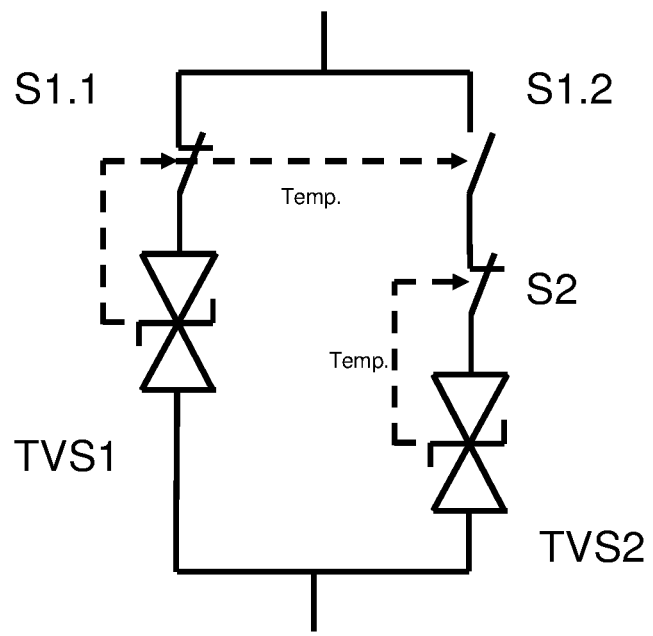
Figure 3:
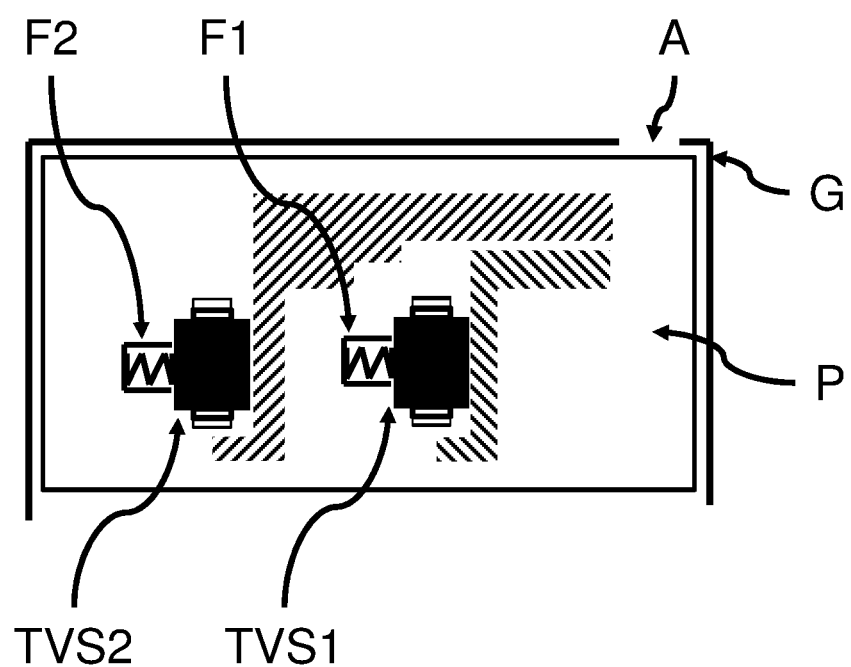
Figure 4:
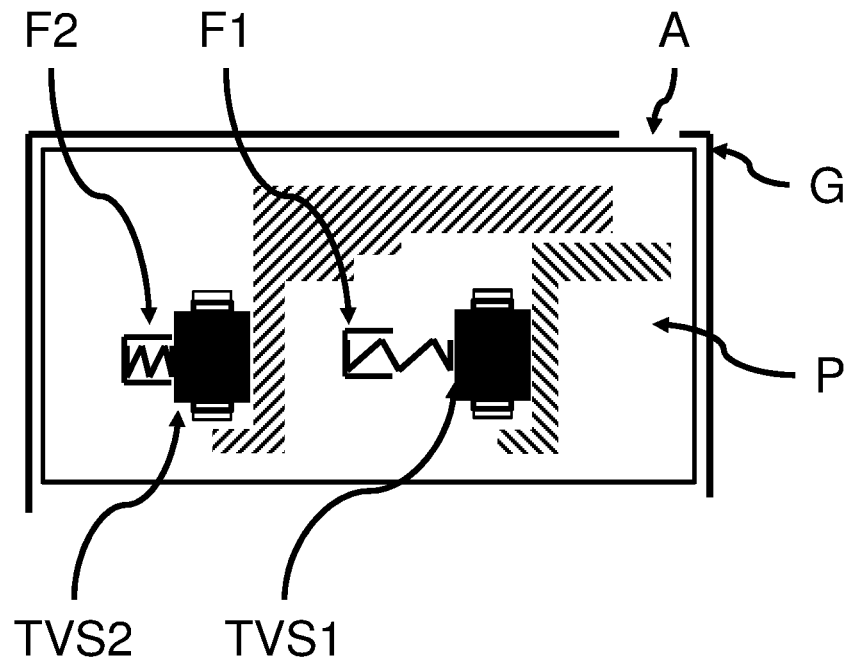
Figure 5:
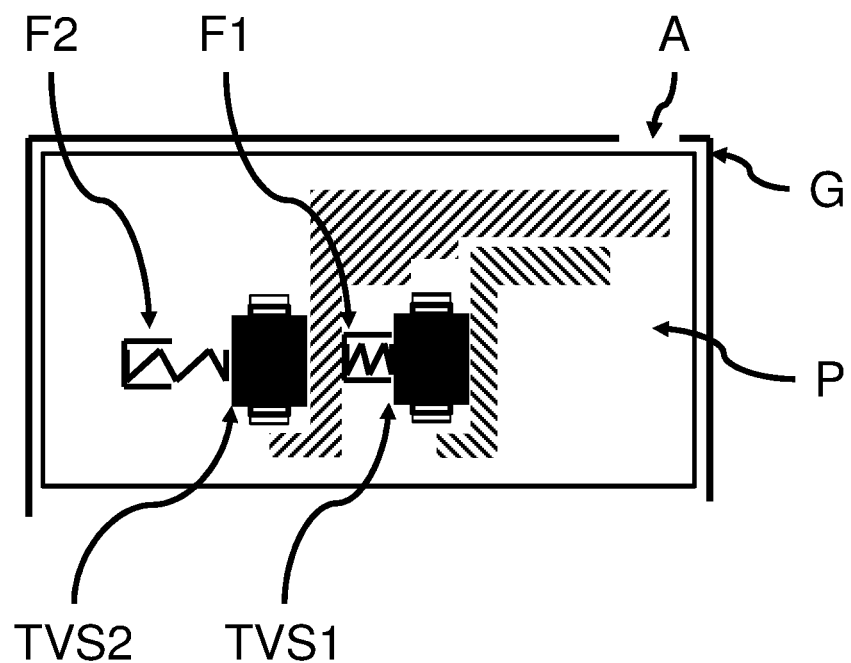

FIG. 1 shows a first schematic circuit diagram of embodiments of the invention,

FIG. 2 shows a second schematic circuit diagram of embodiments of the invention, FIG. 3 shows a schematic cross sectional representation of embodiments of the invention in a first state, FIG. 4 shows a schematic cross sectional representation of embodiments of the invention in a second state, and FIG. 5 shows a schematic cross sectional representation of embodiments of the invention in a third state.

DETAILED PRESENTATION OF THE INVENTION

In the following, the invention shall be presented in greater detail with reference to the figures. It should be noted that various aspects shall be described, each of which may be used alone or in combination. That is, any aspect can be used with different embodiments of the invention, unless explicitly represented as a mere alternative.

Furthermore, for the sake of simplicity, generally only one item shall be mentioned in the following. But unless explicitly stated, the invention may also have several of the respective items.

Accordingly, the use of the word "one" should be taken to mean that at least one item is used in a simple embodiment.

The figures show a space-limited protection module 1 with at least two overvoltage protection elements TVS1, TVS2) in parallel current branches.

The protection module 1 has a local multistage indicator for indicating at least one operating state, a warning state and a defect state.

The parallel switched overvoltage protection elements TVS1, TVS2 are arranged on a circuit board P in electrical connection to conductor tracks of the circuit board P and attached in a thermally softenable manner.

The first overvoltage protection element TVS1 is associated with a first force accumulator F1 and the second overvoltage protection element TVS2 is associated with a second force accumulator F2. The first force accumulator F1 and/or the second force accumulator F2 may be outfitted, for example, with springy elements, which are activated or installed after the soldering of the first overvoltage protection element TVS1 or the second overvoltage protection element TVS2. For example, for this purpose a receptacle can be arranged on the circuit board P next to the corresponding element—as indicated in FIG. 3-5. In the non-triggered soldered state of the overvoltage protection elements TVS1, TVS2—per FIG. 3—the first force accumulator F1 and the second force accumulator F2 each exert a force on the associated overvoltage protection element TVS1, TVS2 in parallel with the surface of the circuit board P.

In event that an overvoltage protection element is heated beyond the softening point of the thermal adhesion of the respective overvoltage protection element, the thus-triggered overvoltage protection element can be displaced to the side (parallel to the surface of the circuit board P), so that an electrical connection to the respective conductor tracks of the circuit board P is interrupted.

An interruption of the electrical connection of the second overvoltage protection element TVS2—see FIG. 5—is always signaled as a defect state, while the interruption of just the electrical connection of the first overvoltage protection element TVS1—see FIG. 4—is signaled as a warning state.

Hence, one warning state and one defect state are made possible. The presented invention thus makes it possible to work in a space-optimized way, so that traditional structural sizes, but also smaller structural sizes of less than 8 mm, are made possible.

In one embodiment of the invention, a holding device is provided for the first overvoltage protection element TVS1, which spatially fixes the disconnected first overvoltage protection element in a defined manner after the disconnection.

This holding device may comprise, e.g., a physical boundary, such as an end stop and/or a solder pad. Solder pads may be configured, e.g., so that the remaining solder at one or both terminals of the first overvoltage protection element TVS1 cools down in contact with the solder pad and thereby secures the first overvoltage protection element TVS1. Likewise, however, as an alternative or in addition, this may also be accomplished by pressing the first overvoltage protection element TVS1 against a mechanical receptacle. This configuration prevents a disconnected first overvoltage protection element TVS1 from wandering inside the module 1 and possibly causing other damage.

In one embodiment of the invention, a holding device is provided for the second overvoltage protection element TVS2, which spatially fixes the disconnected first overvoltage protection element in a defined manner after the disconnection.

This holding device may comprise, e.g., a physical boundary, such as an end stop and/or a solder pad. Solder pads may be configured, e.g., so that the remaining solder at one or both terminals of the second overvoltage protection element TVS2 cools down in contact with the solder pad and thereby secures the second overvoltage protection element TVS2. Likewise, however, as an alternative or in addition, this may also be accomplished by pressing the second overvoltage protection element TVS2 against a mechanical receptacle. This configuration prevents a disconnected second overvoltage protection element TVS2 from wandering inside the module 1 and possibly causing other damage.

In another embodiment of the invention—as shown in FIG. 2—the current branch of the second overvoltage protection element TVS2 is connected only after disconnection of the first overvoltage protection element TVS1, so that in the operating state only the first current branch is electrically conductively connected and in the warning state only the second current branch is electrically conductively connected.

In another embodiment of the invention, the overvoltage protection element TVS1 has a different characteristic from TVS2, with the first overvoltage protection element TVS1 being interrupted at a lesser overloading than the second overvoltage protection element TVS2, while both current branches are electrically conductively interconnected in the operating state.

In another embodiment of the invention, the differing characteristic is a different response voltage.

According to another embodiment of the invention, the local indicator is realized by mechanically triggered slides, which are carried along with the sideways displacement of an overvoltage protection element.

In FIGS. 3-5, the slide associated with the first overvoltage protection element ZVS1 is represented e.g. by hatching from upper right to lower left. The slide associated with the second overvoltage protection element TVS2, on the other hand, is represented by hatching from lower right to upper left.

Now—as shown in FIG. 4—if the first overvoltage protection element TVS1 is triggered, the slide is displaced into an indicator window A in the housing G. On the other hand—as shown in FIG. 5—if the second overvoltage protection element TVS2 is triggered, the other slide is displaced into the indicator window A in the housing G.

The configuration of the slide—here, a physical overlapping—ensures that, e.g., the defect state covers the warning state and thus can be indicated independently of the warning state.

In a further embodiment of the invention, the overvoltage protection elements TVS1, TVS2 are chosen from a group comprising Transient Voltage Suppressor-Diode (TVS diode), gas-filled arrester, varistor. The overvoltage protection elements may also be chosen differently.

By means of the protection module 1, it is possible to disconnect an electronic component in the event of excessive heating of the component, especially an overvoltage protection element. Even after the disconnection of the component, a protection function continues to exist. Depending on the configuration of the component TVS1, TVS2, this is also a redundancy function.

The two overvoltage protection elements TVS1, TVS2 are provided with a disconnection device (thermal detachment—represented as switch S1, S2 or S1.1.) which transfers the respective overvoltage protection element to a safe operating state in event of a fault.

The required structural space is minimized in this way and enables a secure shutoff even in the event of a major temperature rise. Furthermore, the protection module 1 can be produced economically.

The disconnection of an overvoltage protection element TVS1, TVS2 can be signaled both locally in an indicator A or also through a telecommunication system (not shown—e.g., through switches at the force accumulator F1, F2 and/or at the slides), in such a way that the disconnection of a first overvoltage protection element is signaled by a first color (such as orange/yellow) and the disconnection of the second overvoltage protection element is signaled by a second color (such as red).

The two overvoltage protection elements TVS1, TVS2 can be fastened to a circuit board P with low-melting solder. A spring F1 or F2 (e.g., a compression spring) continually exerts a force on the respective overvoltage protection element TVS1, TVS2. If an overvoltage protection element TVS1, TVS2 becomes heated in event of a fault, it is displaced along the surface of the circuit board P.

FIG. 1 shows a second overvoltage protection element TVS2, which is switched in parallel with the first overvoltage protection element TVS1, and dimensioned such that upon overloading of the first overvoltage protection element TVS it is comparatively less overloaded, so that even after disconnection of the overloaded first overvoltage protection element TVS1 a protective function will continue to be provided.

If, now, at a later time, the second overvoltage protection element TVS2 is overloaded, the second overvoltage protection element TVS2 is likewise displaced along the surface of the circuit board P.

This component dimensioning of the two electronic overvoltage protection elements TVS1, TVS2 may be accomplished, e.g., through the choice of the response voltage. A second overvoltage protection element TVS will be dimensioned such that the response voltage of the overvoltage protection element TVS2 is chosen to be higher, yet low enough so that the requirements placed on the limit voltage are still fulfilled.

The disconnection and displacement of the first electronic overvoltage protection element TVS1 is signaled with a first color (such as orange or yellow). In this way, the client can identify the preliminary damage.

The disconnection and displacement of the second electronic overvoltage protection element TVS2 is signaled with a second color (such as red). In this way, the client can identify the defect of the SPD.

Alternatively to the different dimensioning of the parallel configured protection elements, as described above, the disconnection and displacement of the first electronic overvoltage protection element TVS1 may cause the second electronic overvoltage protection element TVS2 to be switched on—as shown in FIG. 2. This second overvoltage protection element TVS2 then takes over the protection function. In this alternative embodiment, the two electronic components may be dimensioned identically.

LIST OF REFERENCE NUMBERS

1 Space-limited protection module
TVS1, TVS2 Overvoltage protection element
P Circuit board
F1, F2 Force accumulator
A Indicator
G Housing
S1, S1.1, S1.2 Switch
S2 Switch

The invention claimed is:

1. A space-limited protection module with at least two overvoltage protection elements in parallel current branches, wherein the protection module comprises a local multistage indicator for indicating at least one operating state, a warning state and a defect state, wherein the parallel switched overvoltage protection elements are arranged on a circuit board in electrical connection to conductor tracks of the circuit board and attached in a thermally softenable manner, wherein the first overvoltage protection element is associated with a first force accumulator and the second overvoltage protection element is associated with a second force accumulator, which in a soldered state exerts a force on a respective overvoltage protection element in parallel with a surface of the circuit board, so that in an event of a heating of an overvoltage protection element beyond a softening point of a thermal adhesion the respective overvoltage protection element is displaced sideways, so that an electrical connection to the conductor tracks of the circuit board is interrupted, wherein an interruption of the electrical connection of the second overvoltage protection element is always signaled as a defect state while the interruption of just the electrical connection of the first overvoltage protection element is signaled as a warning state.

2. The protection module as claimed in claim 1, wherein a holding device is provided for the first overvoltage protection element, which spatially fixes a disconnected first overvoltage protection element in a defined manner after disconnection.

3. The protection module (as claimed in claim 1, wherein a holding device comprises a solder pad.

4. The protection module as claimed in claim 1, wherein a holding device comprises a mechanical receptacle, against which the first disconnected overvoltage protection element is held by the first force accumulator.

5. The protection module as claimed in claim 1, wherein a current branch of the second overvoltage protection element is connected only after disconnection of a first overvoltage protection element, so that in the operating state only the first current branch is electrically conductively connected and in the warning state only a second current branch is electrically conductively connected.

6. The protection module as claimed in claim 1, wherein characteristics of the overvoltage protection elements differ, with a first overvoltage protection element being interrupted at a lesser overloading than a second overvoltage protection element, and both current branches are electrically conductively interconnected in the operating state.

7. The protection module as claimed in claim 6, wherein a different characteristic is a different response voltage.

8. The protection module as claimed in claim 1, wherein the local indicator is realized by mechanically triggered slides, which are carried along with a sideways displacement of an overvoltage protection element.

9. The protection module as claimed in claim 1, wherein the overvoltage protection elements are chosen from a group comprising TVS diode, gas-filled arrester, and varistor.

10. A space-limited protection module with at least two overvoltage protection elements in parallel current branches, wherein the protection module comprises a local multistage indicator for indicating at least one operating state, a warning state and a defect state, wherein a parallel switched overvoltage protection elements are arranged on a circuit board in electrical connection to conductor tracks of the circuit board and attached in a thermally softenable manner, wherein a first overvoltage protection element is associated with a first force accumulator and a second overvoltage protection element is associated with a second force accumulator, which in a soldered state exerts a force on a respective overvoltage protection element in parallel with a surface of the circuit board, so that in an event of a heating of an overvoltage protection element beyond a softening point of a thermal adhesion the respective overvoltage protection element is displaced sideways, so that an electrical connection to the conductor tracks of the circuit board is interrupted, wherein an interruption of the electrical connection of the second overvoltage protection element is always signaled as a defect state while the interruption of just the electrical connection of the first overvoltage protection element is signaled as a warning state, wherein furthermore a holding device is provided for the first overvoltage protection element, which spatially fixes a disconnected first overvoltage protection element in a defined manner after disconnection, wherein the holding device comprises a solder pad, wherein the holding device comprises a mechanical receptacle, against which a first disconnected overvoltage protection element is held by the first force accumulator, wherein a current branch of the second overvoltage protection element is connected only after disconnection of the first overvoltage protection element, so that in the operating state only the first current branch is electrically conductively connected and in the warning state only the second current branch is electrically conductively connected, wherein characteristics of the overvoltage protection elements differ, with the first overvoltage protection element being interrupted at a lesser overloading than the second overvoltage protection element, and both current branches are electrically conductively interconnected in the operating state, wherein a different characteristic is a different response voltage, wherein a local indicator is realized by mechanically triggered slides, which are carried along with a sideways displacement of an overvoltage protection element, and wherein the overvoltage protection elements are chosen from a group comprising TVS diode, gas-filled arrester, and varistor.

\* \* \* \* \*